United States Patent [19]

Lee

[11] Patent Number: 5,019,996
[45] Date of Patent: May 28, 1991

[54] PROGRAMMABLE POWER SUPPLY LEVEL DETECTION AND INITIALIZATION CIRCUITRY

[75] Inventor: Sai-keung Lee, Milpitas, Calif.

[73] Assignee: Advanced Micro Devices, Inc., Sunnyvale, Calif.

[21] Appl. No.: 584,421

[22] Filed: Sep. 13, 1990

Related U.S. Application Data

[63] Continuation of Ser. No. 237,764, Aug. 29, 1988, abandoned.

[51] Int. Cl.$^5$ .......................... G06F 9/00; G08B 21/00
[52] U.S. Cl. .................................... 364/483; 340/661; 364/550; 364/579
[58] Field of Search ............... 364/200, 900, 480, 481, 364/483, 492, 550, 579, 551.01, 707; 323/238; 340/660–663

[56] References Cited

U.S. PATENT DOCUMENTS

| | | | |
|---|---|---|---|
| 4,403,213 | 9/1983 | Khamare et al. | 340/661 |
| 4,428,020 | 1/1984 | Blanchard, Jr. | 340/660 |
| 4,503,479 | 3/1985 | Otsuka et al. | 340/661 |
| 4,559,497 | 12/1985 | Farrugia | 340/661 |
| 4,562,548 | 12/1985 | Andersen et al. | 364/483 |

OTHER PUBLICATIONS

Terry Patterson, "Battery-backup circuit offers system reset," EDN May 26, 1988, p. 212.
George Indorf, "Timer output has variable duty cycle," EDN May 26, 1988, p. 214.
Robert McCarthy, "Digital one-shot has power-on preset," EDN Jan. 21, 1988, p. 208.
T. G. Barnett, "Comparator circuit monitors window events," EDN Feb. 18, 1988, p. 235.
William Andreycak, "Soft-start and delay protects power supply," EDN Feb. 4, 1988, p. 189.
Neal E. Pritchard, "Power-fail circuit gives prompt response," EDN Mar. 31, 1988, p. 197.

Primary Examiner—Kevin J. Teska
Attorney, Agent, or Firm—Fliesler, Dubb, Meyer & Lovejoy

[57] ABSTRACT

An apparatus for a signal processing system connected to a power supply having an output level and receiving a clock signal, that is responsive to the output level of the power supply, generates control signals for use as interrupt signals, reset signals and warning signals to the system. The apparatus comprises a detector for generating an undervoltage signal while the output level of the power supply is below a prespecified threshold; a circuit for supplying a programmable signal indicating a programmable threshold; a comparator connected to the power supply and receiving the programmable signal, for generating a voltage threshold signal while the output level is below the programmable threshold; and a programmable logic circuit. The programmable logic circuit receives general purpose inputs, the clock, the undervoltage signal and the low voltage signal, and generates the control signals. Using the invention, designers can easily create a wide variety of individual and sequential control signals which can be generated during power-up and power glitches, in response to externally forced signals, or during undervoltage occurrences.

38 Claims, 5 Drawing Sheets

PROGRAMMABLE POWER SUPPLY LEVEL DETECTION AND INITIALIZATION CIRCUITRY

This application is a continuation of Ser. No. 07/237,764, filed Aug. 29, 1988, now abandoned.

BACKGROUND OF THE INVENTION

1. Field of the Invention

The present invention relates to devices providing different types of reset, interrupt and warning signals to signal processing systems in response to power supply output levels and to initialization signals.

2. Description of Related Art

Signal processing systems, such as computers, industrial controllers and peripheral devices, are typically sensitive to output levels of power supplies driving the systems. In fact, such systems are often characterized by unique requirements for initialization control sequences, power-up and power-down control sequences, and reset sequences during power glitches. There are no standard formats for these control sequences. Therefore, designers spend a great deal of time creating circuits for generating reset, interrupt and warning signals and sequences of signals to meet the needs of the particular signal processing system being designed.

For instance, microcontrollers and microprocessors must be reset on power-up, and a reset signal must be held asserted for some time after the clock is running and logic is fully functional. Thus, for the Intel 8051 microcontroller, the reset signal must be asserted active high for 24 cycles during power-up. For the Intel 80286 microprocessor, the reset signal must be asserted active high for 16 cycles. For the Advanced Micro Devices Am29000 microprocessor, the reset signal must be asserted active low for 4 cycles. For the Motorola 68000 microprocessor, the reset signal must be asserted active low together with a halt signal active low for 10 cycles and 100 milliseconds after power-up. In the prior art, circuits implemented to ensure that reset signals are asserted for the required duration, are based on circuits built of resistors and capacitors, and some of them are also coupled with preset voltage reference comparators (see, Patterson, "Battery-Backup Circuit Offers System Reset," EDN, May 26, 1988, pp. 212–214; Barnett, "Comparator Circuit Monitors Window Events," EDN, Feb. 18, 1988, p. 235; Andraycak, "Soft-Start and Delay Protects Power Supply," EDN, Feb. 4, 1988, p. 189; and Pritchard, "Power-Fail Circuit Gives Prompt Response," EDN, Mar. 31, 1988, p. 197). Delay circuits can also be implemented using digital monostable multivibrators for generating output pulses of programmed output duration in response to a supplied reset signal (see McCarthy, "Digital One-Shot Has Power-On Preset," EDN, Jan. 21, 1988, p. 208).

It can be seen that these circuits are design-intensive. This is particularly true when one recognizes that signal processing systems can be exceedingly complex, requiring initialization sequences for large numbers of devices having a variety of parameters in the same system. For instance, some resets within a single system may be required to be active low, while others must be active high, some synchronized on a falling edge of the clock while others are synchronized on a rising edge. Others may require warning signals to be asserted on certain abnormal conditions of the power supply.

Accordingly, a need exists for a device simplifying the design of initialization and power supply level detection circuitry for use with signal processing systems.

SUMMARY OF THE INVENTION

The present invention provides an apparatus responsive to the output level of a power supply and to other externally supplied signals, for generating control signals adapted for use as interrupt signals, reset signals and warning signals for a signal processing system. The apparatus is easily programmable by a user, so that the control signals can be configured easily to meet the needs of a complicated signal processing system.

According to one aspect, the present invention provides an apparatus for a signal processing system that is connected to a power supply having an output level and receiving a clock signal, wherein the apparatus is responsive to the output level of the power supply for generating the control signals. The apparatus comprises a detector for generating an undervoltage signal while the output level of the power supply is below a prespecified threshold; a programmable logic circuit for supplying a programmable signal indicating a programmable threshold; a comparator connected to the power supply and receiving the programmable signal, for generating a voltage threshold signal while the output level of the power supply is below the programmable threshold; and a programmable logic circuit. The programmable logic circuit receives the clock signal, the undervoltage signal and the low voltage signal, and generates the control signals.

According to one embodiment, the programmable logic circuit is further connected to receive at least one general purpose input signal to which the programmable logic circuit is responsive in generating the control signals.

According to another aspect of the present invention, the programmable logic circuit is implemented using a programmable logic array technology having a plurality of array inputs and a plurality of array outputs. The undervoltage signal the voltage threshold signal, the general purpose signal and the clock signal are supplied to the array inputs. The programmable logic array generates the plurality of array outputs in response to a programmable combination of the signals applied to the array inputs. The array outputs are coupled to a plurality of output circuits, each of which is connected to receive at least one array output and supplies a control signal in response thereto.

According to this aspect, the programmable logic array may be connected to a counter which is controlled by array outputs, and which supplies binary counter outputs as array inputs. Also, a plurality of state registers may be provided with the programmable logic array, each connected to receive an array output and supplying a state output, wherein the state output is connected to one of the plurality of array inputs.

The present invention allows a designer to create a wide variety of control signal and sequences of control signals using a single programmable apparatus. The control signals can be generated during power-up, during power glitches, in response to externally forced signals or during undervoltage events.

Other aspects and advantages of the present invention can be seen from a review of the figures, the detailed description and the claims.

DESCRIPTION OF THE PREFERRED EMBODIMENT

A detailed description of a preferred embodiment of the present invention is provided with reference to FIGS. 1 and 2A-2D.

Figure 1:
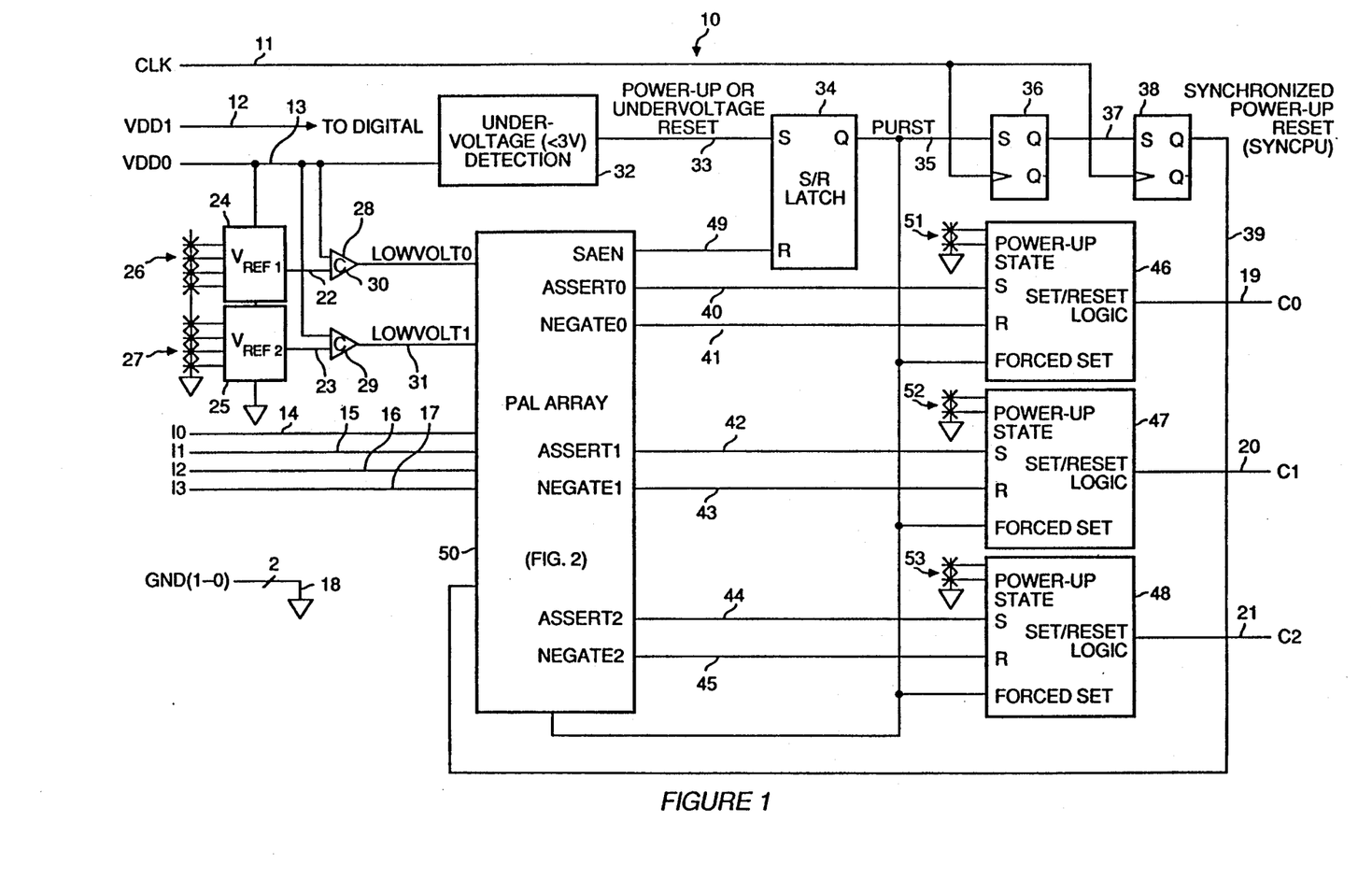
FIG. 1 is a block diagram of an integrated circuit implementing the apparatus of the present invention.
Figure 2A:
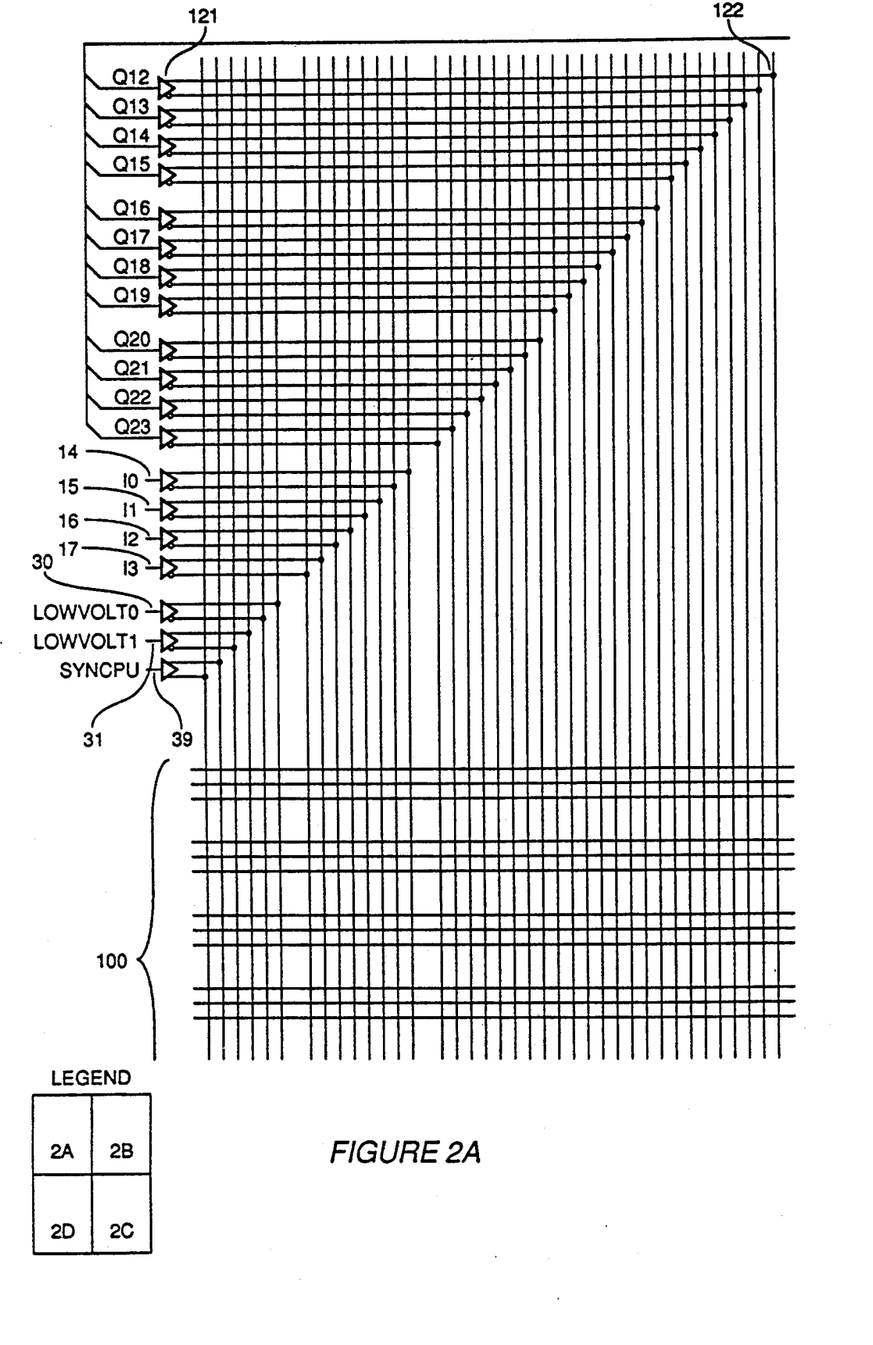
FIGS. 2A-2D form a logic diagram of the programmable logic array in the preferred embodiment of the integrated circuit shown in FIG. 1.
Figure 2B:
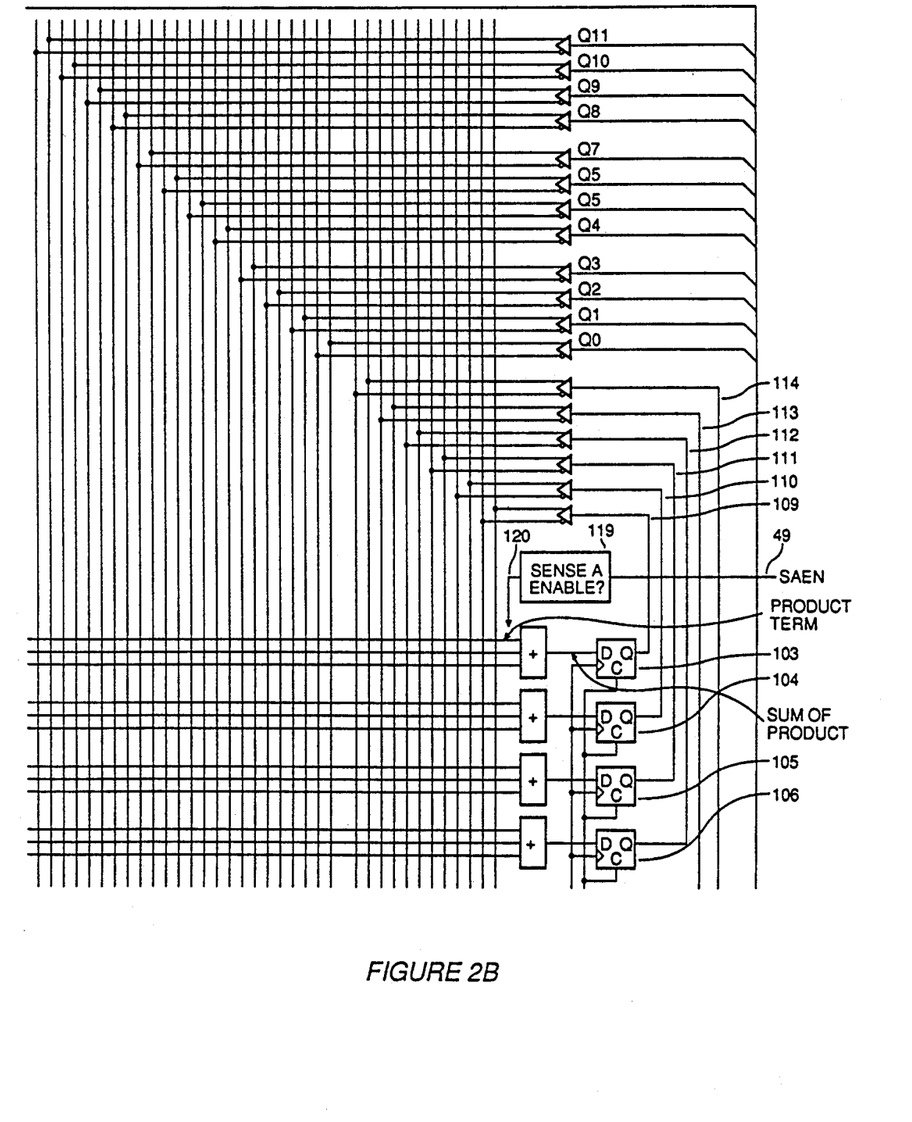
Figure 2C:
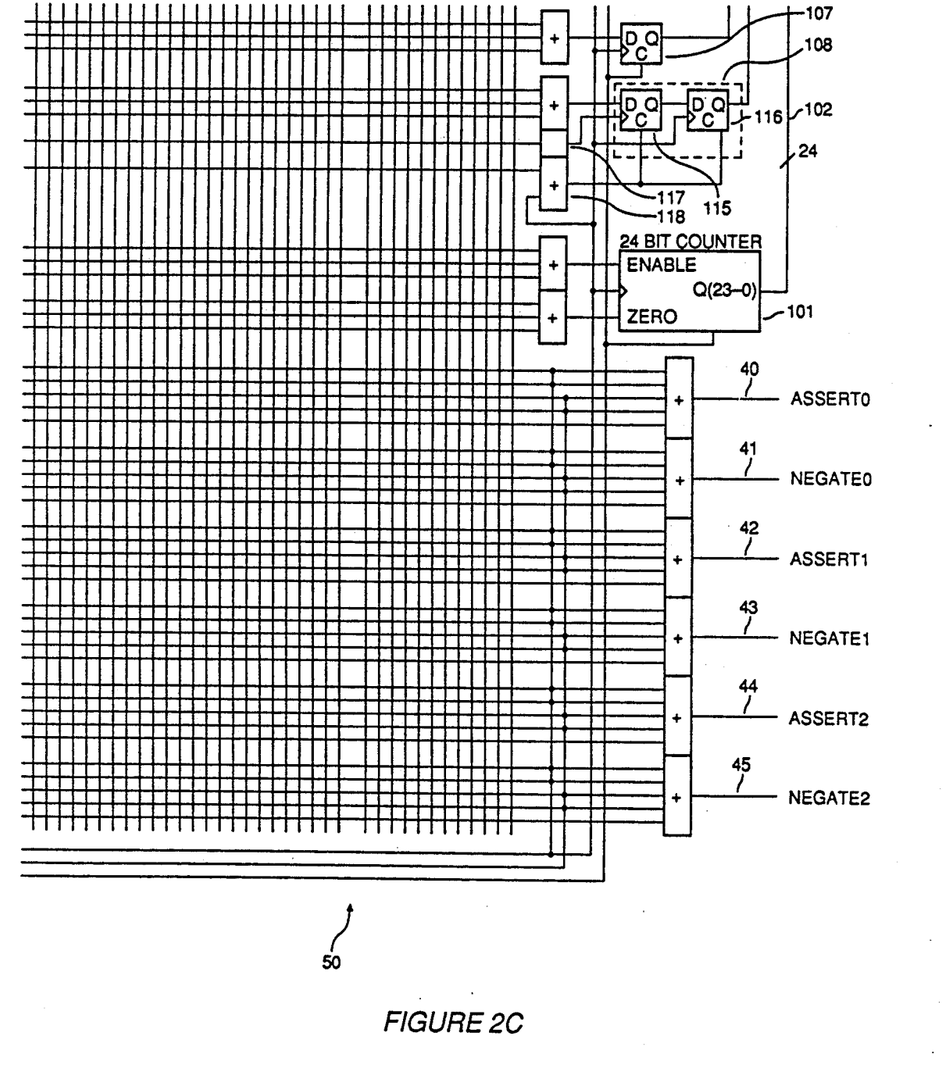
Figure 2D:
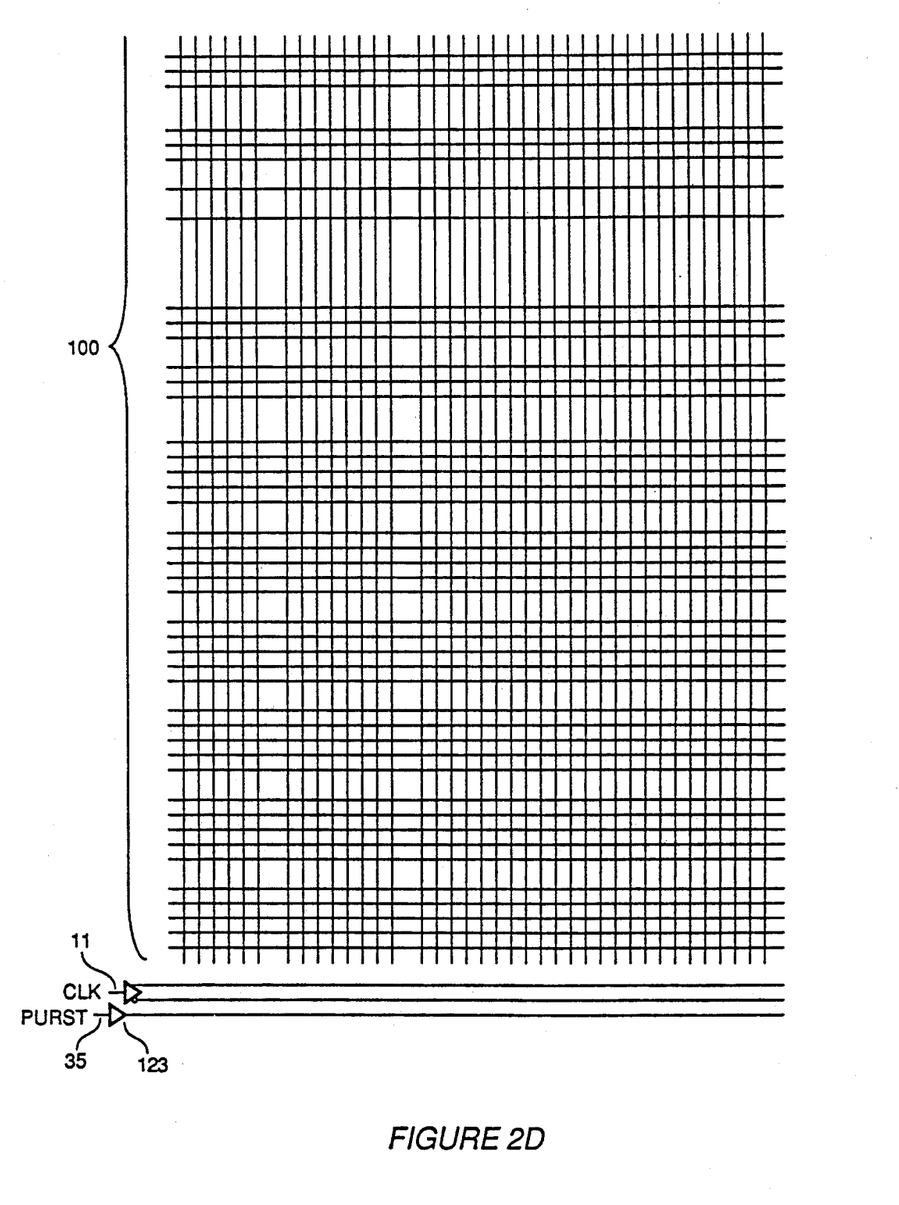

FIG. 1 is a block diagram of an integrated circuit implementing an apparatus for generation of initialization and voltage detection control signals for use with a signal processing system. The inputs to the apparatus 10 include a clock signal CLK on line 11, two voltage reference signals VDD1, VDD0 on lines 12 and 13, respectively, a plurality of inputs I0, I1, I2, I3 on lines 14, 15, 16 and 17, respectively, and two ground inputs GND (1-0), one for analog and one for digital portions of the chip, indicated heuristically at line 18.

The outputs of the apparatus 10 include control signals C0, C1, C2 on lines 19, 20 and 21, respectively.

In addition to the externally supplied signals described above, two analog reference signals VREF1 and VREF2, are supplied on lines 22 and 23 at the output of voltage reference generators 24 and 25, respectively. The voltage reference generators 24, 25 are each programmed by a set 26, 27, respectively of fuse programmable cells. Thus the analog reference signals VREF1 and VREF2 are programmable signals in preferred embodiments. Each set 26, 27 generates a binary representation of a voltage reference. The voltage reference generators 24, 25 generate analog outputs on lines 22 and 23, respectively. One implementation of one such generator can be a voltage reference, such as may be supplied by a band gap voltage reference generator, coupled with a digital-to-analog converter, such that the digital-to-analog converter converts the binary fuse pattern to an analog output scaled with reference to the fixed voltage reference. Techniques of implementing voltage references and digital-to-analog converters are well-known in the art.

The analog reference signals on lines 22 and 23 are supplied, respectively, as inputs to comparators 28 and 29. The second inputs to comparators 28 and 29 are the power supply output VDD0 on line 13, which is scaled by the comparators 28 and 29, as required to match the fixed voltage reference internal to the voltage reference generators 24 and 25. The output LOWVOLT0 of comparator 28 is a voltage threshold signal supplied on line 30 and has a first state while the level of VDD0 is below the level indicated by VREF1 and a second state while VDDO is above the level indicated by VREF1. The output LOWVOLT1 of comparator 29 is supplied on line, 31 and has a first state while the power supply voltage VDD0 is below the level indicated by VREF2 and a second state while VDD0 is above the level indicated by VREF2.

The power supply output VDD0 on line 13 is also supplied to an undervoltage detection circuit 32. The undervoltage detection circuit 32 generates an output while the power supply level indicated on line 13 falls below a prespecified threshold of three volts in the illustrated embodiment. The output of the undervoltage detection circuit 32 is supplied on line 33 as an S input of an S/R latch 34. The output PURST of S/R latch 34 is supplied on line 35 as an S input to flip-flop 36. The output of flip-flop 36 is supplied on line 37 to the input of flip-flop 38. Flip-flops 36 and 38 are clocked by the clock signal on line 11. The output of flip-flop 38 is a synchronized signal, such as may be used as a synchronized power-up reset SYNCPU. This signal is supplied on line 39. Two flip-flops are used to synchronize signal PURST on line 35 in order to avoid metastability due to clocking of a synchronized signal.

The clock on line 11, LOWVOLT0 on line 30, LOWVOLT1 on line 31, I0-I3 on lines 14-17, SYNCPU on line 39 are all supplied as array inputs to a programmable logic array 50. In the illustrated embodiment, the programmable logic array includes a programmable AND-field with a fixed OR-field. The array outputs, ASSERT0 on line 40, NEGATE0 on line 41, ASSERT1 on line 42, NEGATE1 on line 43, ASSERT2 on line 44, and NEGATE2 on line 45 are supplied as inputs to a plurality of output circuits including set/reset logic circuit 46, set/reset logic circuit 47 and set/reset logic circuit 48.

The ASSERT0 signal on line 40 and the NEGATE0 signal on line 41 are supplied as S and R inputs, respectively, to the set/reset logic circuit 46. The PURST signal on line 35 is supplied as a forced set/reset input to the set/reset logic circuit 46. The output of set/reset logic circuit 46 is supplied on line 19 as control signal C0.

The ASSERT1 signal on line 42 and the NEGATE1 signal on line 43 are supplied as S and R inputs, respectively, to set/reset logic circuit 47. The PURST signal on line 35 is supplied as a forced set/reset input to the set/reset logic circuit 47. The output of set/reset logic circuit 47 is supplied on line 20 as the control signal C1.

The ASSERT2 signal on line 44 and the NEGATE2 signal on line 45 are supplied as S and R inputs, respectively, to set/reset logic circuit 48. The PURST signal on line 35 is supplied as a forced set/reset input to set/reset logic circuit 48. The output of set/reset logic circuit 48 is supplied on line 21 as the control signal C2.

The set/reset logic circuits 46, 47, 48 each include fuse programmable inputs 51, 52, 53, respectively. These fuse programmable inputs determine the power-up state for the set/reset logic circuit outputs C0, C1, C2. These signals will be active high when set if the power-up state is set to be high, and active low when set if the power-up state is set to be active low. On a high state of the signal PURST on line 35, the outputs C0, C1, C2 will be forced to the states as determined by the fuse programmable inputs 51, 52, 53, respectively. The combination of a high state of signal PURST and a high state indicated by fuse programmable inputs 51, 52, 53, etc., will force outputs C0, C1, C2 to be high on power up.

The PURST signal on line 35 is also supplied as an input to the programmable logic array 50, and may be supplied as an array input. However, in the embodiment which is illustrated in more detail in FIGS. 2A-2D, the PURST signal is used as a control signal for a counter and a buried state register in the programmable logic array.

The programmable logic array 50 also generates a sense-amp enable signal SAEN on line 49. This signal is supplied as a reset input to the S/R latch 34. When the programmable logic array is functioning, power-up reset is removed so that the programmable logic array can start operating.

FIGS. 2A-2D schematically illustrate a programmable logic array 50 including a programmable AND-plane 100 where horizontal lines supply product terms and intersections of horizontal lines with vertical lines indicate fuse programmable points for generation of the product term. These product terms are supplied as inputs to a fixed OR-array where the outputs of the OR-gates supply sum of product terms. The array inputs are designated array outputs. The array inputs include the signals I0-I3, LOWVOLT0, LOWVOLT1, SYNCPU, and CLK as described with reference to FIG. 1. These inputs have the same reference numbers in FIGS. 2A-2D as they have in FIG. 1. Other array inputs include Q0-Q23 which are supplied at the output of a 24-bit counter 101 across bus 102. In addition, a plurality of state registers including registers 103, 104, 105, 106, 107 and 108 supply array inputs across their respective state output lines 109, 110, 111, 112, 113, 114.

The 24-bit counter 101 includes control inputs ENABLE and ZERO -which are supplied by array outputs. The counter 101 is clocked by the clock signal from line 11 and includes a clear input which is connected to receive the PURST signal from line 35. The outputs Q23-Q0 of the counter are a set of counter outputs which can be used in sequencing, generation of delays, and the like, by the programmable logic circuit 50. Alternatively, the set of counter outputs may include a number of prespecified count outputs which supply a single pulse when the counter reaches the corresponding prespecified counts.

The counter 101 in the programmable logic array 50 is enabled to count up if the array output at the ENABLE input to the counter is asserted. It is initialized to all zeroes synchronously by the array output at the input ZERO to the counter. The function table of the counter is as follows:

| ZERO | ENABLE | COUNTER OPERATION |
|------|--------|-------------------|
| 0 | 0 | Hold |
| 0 | 1 | Count-up |
| 1 | 0 | Initialized to zeroes |
| 1 | 1 | Initialized to zeroes (ZERO overrides ENABLE) |

The outputs of the counter 101 are made available to the programmable array and can perform functions such as specifying the number of clock cycles for power glitch reset circuitry, or specifying the duration of a reset after the output level of the power supply goes above the reference voltage.

The array outputs are also supplied as inputs to the state registers 103-108. State registers 103-107 are D flip-flops with a Q output coupled as an array input. The state registers 103-107 are clocked by the clock signal on line 11 and cleared by the PURST signal on line 35.

State register 108 includes a first D flip-flop 115 and a second D flip-flop 116. The first D flip-flop 115 is clocked by an array output which is generated in this case by a single input gate 117. The output of D flip-flop 115 is supplied as an input to D flip-flop 116 which is clocked by the clock signal from line 11. Both flip-flops are cleared by an array output supplied from OR-gate 118. The PURST signal is connected as one input to the OR-gate 118, while a second input to OR-gate 118 is a product term from the AND-plane.

The six internal registers of the programmable logic array allow intelligent control of the control signals, such as state sequencing as known in the art.

The sense amp enable signal SAEN on line 49 is generated by a sense amp enable circuit 119. The sense amp enable circuit asserts the SAEN signal on line 49 when the power supplied to the programmable logic circuit achieves a level that enables the sense amps within the array. An implementation of such a circuit will be an extra sense amp coupled to the programmable logic device at line 120 that is designed to operate only when the other sense amps are certain to be operating. The design of a sense amp is well known in the art.

Each of the array inputs including the clock on line 11 is supplied to the AND-array through true and complement drivers, such as driver 121. Prespecified connections of the inputs to vertical lines are indicated by a heavy dot at the intersections such as at 122. The PURST signal on line 35 is supplied through a simple driver 123 without a complement output.

The array outputs ASSERT0 on line 40, NEGATE0 on line 41, ASSERT1 on line 42, NEGATE1 on line 43, ASSERT2 on line 44 and NEGATE2 on line 45 are supplied as array outputs for supply to the output circuits 46, 47, 48 as illustrated in FIG. 1.

The array outputs ASSERT0, NEGATE0, ASSERT1, NEGATE1 ASSERT2 and NEGATE2, can be programmed individually so that the control signals are asserted or removed on the rising edge of the clock, the falling edge of the clock, or asynchronously. For instance, the assertion or negation of the array outputs can be initiated asynchronously when the output level reaches a reference voltage, or when a user-specified condition occurs. User-specified conditions can cause assertion or negation in a variety of formats as illustrated by the following examples:

(1) Asynchronously, as the condition occurs;
(2) Synchronously, on the rising edge of the clock after a pre-programmed pattern is received at input terminals I3-I0;
(3) Synchronously, on the rising edge of the clock after a pre-programmed pattern is received at input terminals I3-I0, and after a pre-programmed number of clocks;
(4) Synchronously, on the falling edge of the clock after a pre-programmed pattern is received at input terminals I3-I0; during assertion of LOWVOLT0.
(5) Synchronously, on the falling edge of the clock after a pre-programmed pattern is received at input terminals I3-I0, and after a pre-programmed number of clocks; or
(6) As a memory mask reset with one input signal registering a combination of other input signals through use of the state register 108.

These examples are merely illustrative of the flexibility of the present invention. Many more ways exist to assert and negate the outputs than are specified by this list of examples.

Although in the preferred embodiment, the circuits providing programmable signals and the programmable logic array are implemented using fuse programmable circuits such as are commonly used in PAL ® devices manufactured by Advanced Micro Devices, Inc. (PAL ® is a registered trademark of Advanced Micro Devices, Inc.), equivalent circuits can be implemented using fuses blown by laser cutting, CMOS or other field effect transistor programmable circuits, arrays of programmable cells such as used in the logic cell array manufactured by Xilinx of San Jose, California, and other programmable logic devices. Also, rather than) a programmable AND-plane with a fixed OR-array (i.e. a PAL ® device), a programmable logic array may include a programmable OR-plane, and a fixed AND-array (i.e. a PROM device). Other combinations of programmable logic circuits can be used. All of these devices are referred to as programmable logic arrays which are characterized by implementation on an integrated circuit that is configurable by the user.

In operation, it can be seen that the user can configure the apparatus 10 for generating initialization and voltage detection control signals for use with signal processing systems, to meet a wide variety of needs. The control signals can be asserted differently during power-up than during level glitches. Also, these control signals can be configured to operate in a unique manner in response to an undervoltage condition. Externally supplied signals can be used to manipulate the control signals according to user-defined needs. The internal counter and state registers in the programmable logic array provide great flexibility in generating control sequences that may be needed for complicated signal processing systems. Providing a plurality of voltage references to which the output level of the power supply can be compared, gives the user the ability to generate control sequences adaptable to a variety of different devices in a single system.

The undervoltage detection can be used for generation of power-up, or initialization sequences that may be required due to power glitches causing the output level of the power supply to fall below the prespecified threshold, or when a system is first turned on. For many systems, the power-up sequence and the sequence that must be followed during an undervoltage condition, are similar.

The preferred implementation of the present invention illustrated in FIG. 1 can be generalized by providing additional programmable voltage references and additional power supply level inputs. Further, more control signal outputs can be provided. Thus, it can be seen that the present invention can be adapted to provide an integrated circuit that can be applied to an extremely wide variety of signal processing systems with complicated power supply requirements.

Conclusion

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. An apparatus for generating control signals for supply to and control of a signal processing system, the apparatus being connected to a power supply, the power supply having an output level to which the apparatus is responsive, the apparatus receiving a reference signal indicating an analog threshold, the apparatus comprising:
   means, connected to the power supply and to receive the reference signal, for generating a threshold signal indicating whether the output level is above or below the analog threshold; and
   programmable logic means, connected to receive the threshold signal, for generating the control signals in response to the threshold signal.

2. The apparatus of claim 1, wherein the programmable logic means is further connected to receive at least one general purpose input signal in response to which the programmable logic means generates the control signals.

3. The apparatus of claim 1, wherein the programmable logic means comprises:
   a programmable AND-plane including a plurality of programmable AND-gates, each AND-gate accepting a programmable combination of AND-input signals and generating therefrom a product term; and
   a fixed-OR array including a plurality of OR-gates, each OR-gate being hardwired to accept the product terms from a plurality of the AND-gates and generating therefrom a sum-of-products term; wherein
   the AND-input signals include the threshold signal; and the sum-of-products terms include the control signals.

4. The apparatus of claim 1, further including:
   hardwired programmable means for supplying the reference signal.

5. The apparatus of claim 2, wherein the programmable logic means comprises:
   programmable logic having a plurality of array inputs connected to receive the threshold signal and the at least one general purpose input signal, the programmable logic supplying a plurality of array outputs in response to a programmable combination of signals supplied to the plurality of array inputs; and
   a plurality of output circuits, each connected to receive at least one array output of the plurality of array outputs and supplying one control signal of the control signals in response to the at least one array output.

6. The apparatus of claim 5 wherein each given output circuit of the plurality of output circuits includes means for programming a power-up state for the respective one control signal received by the given output circuit.

7. The apparatus of claim 5 further including:
   a counter having a counter control input and a set of counter outputs, wherein the counter control input is connected to one array output of the plurality of array outputs and the set of counter outputs is connected to the plurality of array inputs.

8. The apparatus of claim 5 further including:
   a plurality of state register means, each connected to receive at least one array output of the plurality of array outputs, each state register means for supplying a respective state output of a plurality of state outputs and wherein the plurality of state outputs of the plurality of state register means are connected to the plurality of array inputs.

9. The apparatus of claim 5 further including:
   means, connected to the power supply, for generating an undervoltage signal for supply to the programmable logic while the output level is below a prespecified threshold.

10. The apparatus of claim 9 further including:
register means, connected to receive the undervoltage signal, for generating a reset signal and for providing the reset signal to the plurality of array inputs.

11. An apparatus for generating control signals for supply to and control of a signal processing system, the apparatus being connected to a power supply, the power supply having an output level, the apparatus comprising:
means for supplying a programmable signal, the programmable signal indicating a programmable threshold;
means, connected to the power supply and to receive the programmable signal, for generating a voltage threshold signal having a first state while the output level is below the programmable threshold and having a second state while the output level is above the programmable threshold; and
programmable logic means for generating the control signals, the programmable logic means including,
a programmable logic array having a plurality of array inputs and a providing a plurality of array outputs in response to one or more signals which the array inputs are connected to receive, wherein the array inputs are connected to receive the threshold signal, and wherein the programmable logic means generates the control signals according to the plurality of array outputs.

12. The apparatus of claim 11, wherein the programmable logic array comprises:
a programmable AND-plane including a plurality of programmable AND-gates, each AND-gate accepting a programmable combination of the one or more signals which the array inputs are connected to receive and generating therefrom a product term; and
a fixed-OR array including a plurality of OR-gates, each OR-gate being hardwired to accept the product terms from a plurality of the AND-gates and generating therefrom a respective one of the array outputs in the form of a sum-of-products term.

13. The apparatus of claim 11, wherein the array inputs are further connected to receive at least one general purpose input signal in response to which the programmable logic means generates the control signals.

14. The apparatus of claim 13, wherein the programmable logic means further comprises:
a plurality of output circuits, each connected to receive at least one array output of the plurality of array outputs and supplying a given control signal of the plurality of control signals in response to the at least one array output.

15. The apparatus of claim 14, wherein each given output circuit of the plurality of output circuits includes means for programming a power-up state for the given control signal supplied by the given output circuit.

16. The apparatus of claim 14, further including:
a counter having a counter control input and a set of counter outputs, wherein the counter control input is connected to one array output of the plurality of array outputs, and the set of counter outputs is connected to the plurality of array inputs.

17. The apparatus of claim 14, further including:
a plurality of state register means, each connected to receive at least one array output of the plurality of array outputs, each state register means for supplying a respective state output of a plurality of state outputs, and wherein the plurality of state outputs of the plurality of state register means are connected to the plurality of array inputs.

18. The apparatus of claim 14, further including:
means, connected to the power supply, for generating an undervoltage signal for supply to the programmable logic means while the output level is below a prespecified level.

19. The apparatus of claim 18, further including:
register means, connected to receive the undervoltage signal, for generating a reset signal and for providing the reset signal to the plurality of array inputs.

20. An apparatus for generating control signals for supply to and control of a signal processing system, the apparatus being connected to a power supply, the power supply having an output level, the apparatus comprising:
means for supplying a plurality of programmable signals, each programmable signal indicating a programmable threshold;
means, connected to the power supply and to receive the plurality of programmable signals, for generating a plurality of voltage threshold signals, each given voltage threshold signal corresponding to a given programmable signal and having a first state while the output level is below a given programmable threshold indicated by the given corresponding programmable signal and having a second state while the output level is above the given programmable threshold;
means for supplying a plurality of general purpose signals; and
programmable logic means, connected to receive and responsive to the plurality of general purpose signals and the plurality of voltage threshold signals, for generating the control signals.

21. The apparatus of claim 20, wherein the programmable logic means comprises;
a programmable AND-plane including a plurality of programmable AND-gates, each AND-gate accepting a programmable combination of AND-input signals and generating therefrom a product term; and
a fixed-OR array including a plurality of OR-gates, each OR-gate being hardwired to accept the product terms from a plurality of the AND-gates and generating therefrom a sum-of-products term; wherein
the AND-input signals include the plurality of general purpose signals and the plurality of voltage threshold signals; and
the sum-of-products terms include the control signals.

22. The apparatus of claim 20, wherein the programmable logic means comprises:
programmable logic having a plurality of array inputs connected to receive the plurality of voltage threshold signals and the plurality of general purpose signals, the programmable logic supplying a plurality of array outputs in response to a programmable combination of signals supplied to the plurality of array inputs; and
a plurality of output circuits, each connected to receive at least one array output of the plurality of array outputs and supplying a given control signal of the plurality of control signals in response to the at least one array output.

23. The apparatus of claim 22, wherein each given output circuit of the plurality of output circuits includes means for programming a power-up state for the given control signal supplied by the given output circuit.

24. The apparatus of claim 22, further including:
a counter having a counter control input and a set of counter outputs, wherein the counter control input is connected to one array output of the plurality of array outputs, and the set of counter outputs is connected to the plurality of array inputs.

25. The apparatus of claim 22, further including:
a plurality of state register means, each connected to receive at least one array output of the plurality of array outputs, each state register means for supplying a given state output of a plurality of state outputs, and wherein the plurality of state outputs of the plurality of state register means are connected to the plurality of array inputs.

26. The apparatus of claim 22, further including:
register means, connected to receive the undervoltage signal, for generating a reset signal and for providing the reset signal to the plurality of array inputs.

27. An integrated circuit for generating control signals for supply to and control of a signal processing system, the integrated circuit and the signal processing system each being connected to a power supply having an output level and to a clock, the integrated circuit comprising:
means, connected to the power supply, for generating an undervoltage signal while the output level is below a prespecified threshold;
means for supplying a plurality of programmable signals, each programmable signal indicating a programmable threshold;
means, connected to the power supply and to receive the plurality of programmable signals, for generating a plurality of voltage threshold signals, each given voltage threshold signal corresponding to a given programmable signal and having a first state while the output level is below a given programmable threshold indicated by the given corresponding programmable signal and having a second state while the output level is above the given programmable threshold;
means for supplying a plurality of general purpose signals;
programmable logic having a plurality of array inputs connected to receive the undervoltage signal, the plurality of voltage threshold signals, the plurality of general purpose signals and the clock signal, the programmable logic supplying a plurality of array outputs in response to a programmable combination of signals supplied to the plurality of array inputs; and
a plurality of output circuits, each connected to receive at least one array output of the plurality of array outputs and supplying a given control signal of the control signals in response to the at least one array output.

28. The integrated circuit of claim 27, wherein each given output circuit of the plurality of output circuits includes means for programming a power-up state for the given control signal supplied by the given output circuit.

29. The integrated circuit of claim 27, further including:
a counter connected to receive the clock signal and having a counter control input and a set of counter outputs, wherein the counter control input is connected to one array output of the plurality of array outputs, and the set of counter outputs is connected to the plurality of array inputs.

30. The integrated circuit of claim 27, further including:
a plurality of state register means, each connected to receive at least one array output of the plurality of array outputs, each state register means for supplying a respective state output of a plurality of state outputs, and wherein the plurality of state outputs of the plurality of state register means are connected to the plurality of array inputs.

31. The integrated circuit of claim 27, further including:
register means, connected to receive the undervoltage signal and the clock signal, for generating a reset signal synchronized with the clock signal, and for providing the reset signal to the plurality of array inputs.

32. An apparatus for generating power-up initialization control signals for a signal processing system, the signal processing system being powered by a power supply, the apparatus comprising:
means for prespecifying an analog threshold;
means, responsive to a power output level of the power supply, and connected to the means for prespecifying, for generating a threshold signal indicating whether the power output level of the power supply is above or below the prespecified analog threshold;
programmable logic means, having a plurality of logic array inputs and a plurality of logic array outputs, for generating logic array output signals on at least one of the plurality of logic array outputs in response to a programmable combination of signals provided at the logic array inputs; and
a plurality of output means, each connected to receive at least one of the logic array output signals, each for supplying a respective one of the plurality of power-up initialization control signals in response to the respective at least one logic array signal; wherein
the programmable combination includes the threshold signal.

33. The apparatus of claim 32 wherein:
the apparatus further comprises counter means for generating a counter output signal in response to one of the logic array output signals; and
the programmable combination further includes the counter output signal.

34. The apparatus of claim 32 wherein:
the apparatus further comprises one or more state register means, each for generating at least one state output signal in response to one or more of the logic array output signals; and
the programmable combination further includes the at least one state output signal.

35. The apparatus of claim 32 wherein:
the apparatus further comprises means, connected to the power supply, for generating a reset signal when the output level is below a prespecified threshold; and the programmable combination further includes the reset signal.

36. The apparatus of claim 32, wherein the programmable logic means comprises:
- a programmable AND-plane including a plurality of AND-gates each having inputs programmably couplable to respective ones of the logic array inputs, and each having an output; and
- a fixed OR-plane including a plurality of OR-gates each having inputs hardwired to the outputs of a plurality of the AND-gates, and each having an output coupled to a respective one of the logic array outputs.

37. The apparatus of claim 32, wherein:
- the plurality of logic array inputs are further connected to receive at least one general purpose input signal; and
- the programmable combination further includes the at least one general purpose input signal.

38. The apparatus of claim 37 wherein each given output means comprises:
- means for programming a power-up state for the respective supplied by the plurality of power-up initialization control signals supplied by the given output means.

* * * * *